Aug. 28, 1923.
J. F. BAXA
ANTISKID DEVICE
Filed Sept. 20, 1920
1,466,082
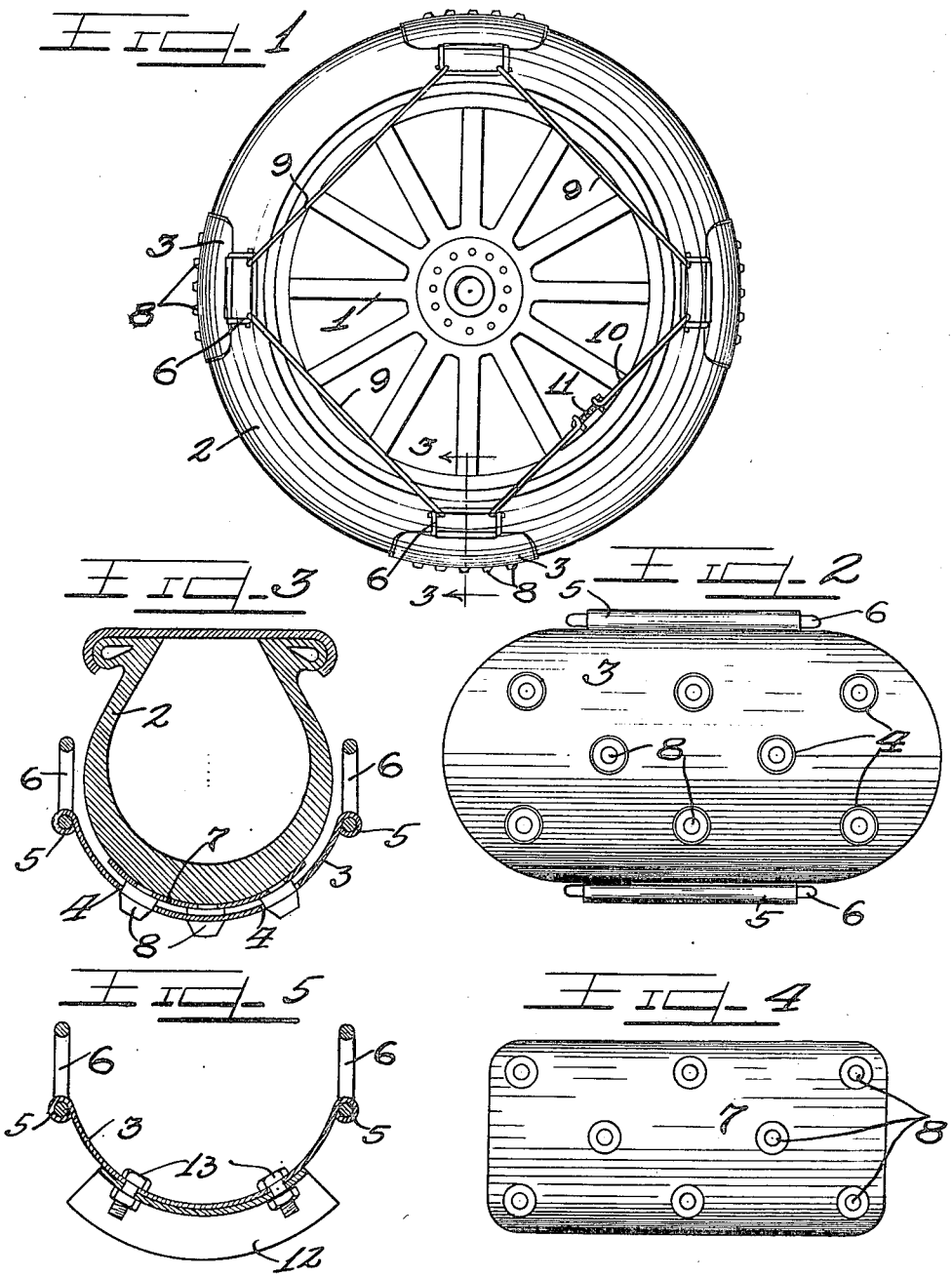

Patented Aug. 28, 1923.

1,466,082

UNITED STATES PATENT OFFICE.

JAMES F. BAXA, OF CHICAGO, ILLINOIS.

ANTISKID DEVICE.

Application filed September 20, 1920. Serial No. 411,448.

*To all whom it may concern:*

Be it known that I, JAMES F. BAXA, a citizen of the United States, and a resident of the city of Chicago, in the county of Cook and State of Illinois, have invented certain new and useful Improvements in an Antiskid Device; and I do hereby declare that the following is a full, clear, and exact description of the same, reference being had to the accompanying drawings, and to the numerals of reference marked thereon, which form a part of this specification.

This invention relates to an improved type of anti-skid device adapted for use on vehicle wheels to prevent skidding on wet slippery pavements.

It is an object of this invention to provide an anti-skid device wherein tread pins or stubs are secured to an inner plate and extend outwardly through apertures in a shoe adapted to be secured in place on the tread portion of a vehicle tire.

Another object of the invention is the construction of an anti-skid device wherein a plurality of apertured shoes are adapted to be engaged on the tread of a tire in position to permit tread pins formed on inner plates to project through the apertured shoes to track on the road, thereby saving wear of said shoes and further permitting replacement of the inner plates and pins when necessary.

It is an important object of this invention to provide an anti-skid device of simple and effective form wherein apertured shoes are adapted to permit tread spurs to project therethrough to prevent skidding or permitting angle ribs to be removably secured on the shoes to afford tractor means whereby a vehicle when stuck in a bad road may be readily released or extricated.

Other and further important objects of this invention will be apparent from the disclosures in the specification and drawings.

The invention (in a preferred form) is illustrated in the drawings and hereinafter more fully described.

On the drawings:

Figure 1 is a side elevation of an automobile wheel equipped with an anti-skid device embodying the principles of this invention.

Figure 2 is an outer plan view of the device.

Figure 3 is an enlarged section taken on line 3—3 of Figure 1.

Figure 4 is an outer plan view of the spur carrying inner plate.

Figure 5 is a transverse section of a tread shoe showing angle members secured thereto.

As shown on the drawings:

The reference numeral 1 indicates a vehicle wheel provided with a tire 2 on which the anti-skidding device is adapted to be engaged. The anti-skidding device comprises a curved metal shield or shoe 3 provided with a plurality of staggered apertures or openings 4, and having the longitudinal margins curled or rolled to afford sleeves or eyes 5. Rotatably engaged in each sleeve 5 is a rectangular wire link or bail 6 to afford members to permit the shoe to be held in place. Seated within the shoe 3 is a curved inner plate 7 having rigidly or removably secured on the outer surface thereof a plurality of pins, calks or spurs 8 staggered to permit the same to register and project through the apertures 4 of the outer plate or shoe 3.

As clearly illustrated in Figure 1, a plurality of shoes 3 are secured in place on the tire 2 by means of connecting rods 9 and 10, the ends of which are connected to the links 6. The connecting rod 10 comprises two rods connected by a tie bolt 11 to permit tensioning of the connecting rods for holding the shoes 3 in spaced relation on the tire. The connecting rods are of course disposed on both sides of the wheel.

It will be noted that each shoe is provided with an inner plate 7, which carries the tread spurs 8. This novel arrangement saves the shoes from wear since the wear is on the spurs. New spurs are adapted to be readily engaged in the inner plate 7 when the spurs in use become worn.

Figure 5 illustrates an additional use for the shoes 3. Should a vehicle get stuck in a bad road or in ruts, the inner plates together with their spurs are removed from the shoes and curved or arc shaped angle irons 12 are removably secured transversely on the outer surface of the shoes by bolts 13 or other suitable means. It will thus be seen that the angle irons 12 afford ribs or tractor members which are adapted to grip the ground so that the vehicle may be readily extricated.

I am aware that numerous details of construction may be varied through a wide range without departing from the principles of this invention, and I therefore do not purpose limiting the patent granted otherwise than necessitated by the scope of the appended claim.

I claim as my invention:

An anti-skid device, comprising a plate curved to fit the exterior surface of a tire tread, said plate being provided with a plurality of apertures disposed longitudinally and transversely of its surface and adapted to receive therethrough spurs on an underlying plate, or bolts for connecting thereto an overlying transversely ribbed tractor plate.

In testimony whereof I have hereunto subscribed my name in the presence of two subscribing witnesses.

JAMES F. BAXA.

Witnesses:
 CARLTON HILL,
 EARL M. HARDINE.